United States Patent
Tushinskiy

(10) Patent No.: US 11,050,499 B1
(45) Date of Patent: Jun. 29, 2021

(54) AUDIENCE RESPONSE COLLECTION AND ANALYSIS

(71) Applicant: INSTREAMATIC, INC., Palo Alto, CA (US)

(72) Inventor: Stanislav Tushinskiy, Mountain View, CA (US)

(73) Assignee: INSTREAMATIC, INC., San Francisco, CA (US)

( * ) Notice: Subject to any disclaimer, the term of this patent is extended or adjusted under 35 U.S.C. 154(b) by 0 days.

(21) Appl. No.: 17/199,689

(22) Filed: Mar. 12, 2021

(51) Int. Cl.
  *G10L 15/28* (2013.01)
  *H04H 60/33* (2008.01)
  *G10L 15/22* (2006.01)
  *G10L 15/20* (2006.01)

(52) U.S. Cl.
  CPC .............. *H04H 60/33* (2013.01); *G10L 15/20* (2013.01); *G10L 15/22* (2013.01)

(58) Field of Classification Search
  CPC ......... G10L 15/00; G10L 15/08; G10L 17/00; G10L 2015/027; G10L 15/04; G10L 15/05; G10L 15/06; G10L 2015/225; G10L 15/16; G10L 25/78; G10L 25/93; G10L 25/90; G10L 2025/932; G10L 2025/935; G10L 2025/937; G10L 25/81; G10L 25/84; G10L 25/87; G10L 15/22; G10L 15/20; H04H 60/33
  See application file for complete search history.

(56) References Cited

U.S. PATENT DOCUMENTS

| | | | | |
|---|---|---|---|---|
| 6,574,614 | B1 * | 6/2003 | Kesel | G06Q 30/02 706/52 |
| 9,818,407 | B1 * | 11/2017 | Secker-Walker | G10L 15/32 |
| 2015/0269529 | A1 * | 9/2015 | Kyllonen | G06Q 10/1053 705/321 |
| 2016/0253989 | A1 * | 9/2016 | Kuo | G10L 15/183 704/257 |
| 2018/0167660 | A1 * | 6/2018 | Atsmon | G10L 15/25 |
| 2019/0311331 | A1 * | 10/2019 | Steinhoff | G06Q 10/1053 |

\* cited by examiner

*Primary Examiner* — Huyen X Vo

(74) *Attorney, Agent, or Firm* — Georgiy L. Khayet

(57) ABSTRACT

Methods and systems for collecting and analyzing an audience response are provided. An example method commences with determining that a media playing device has played a question within a media stream. The method further includes recording, via an acoustic sensor, an ambient acoustic signal for a pre-determined time interval. The method further includes detecting a presence of a voice of a user in the ambient acoustic signal, providing the ambient acoustic signal to a remote computing system, and performing, by the remote computing system, speech recognition of the ambient acoustic signal to obtain a text response. The method further includes adding, by the remote computing system, the text response to a set of text responses and analyzing the set of text responses to obtain a statistics concerning text results. The method then continues with providing, by the remote computing system, the statistics to a provider of the media stream.

20 Claims, 8 Drawing Sheets

600

```
┌─────────────────────────────────────────────────────────┐
│ Determine, by a processor communicatively coupled to a  │
│ media playing device and an acoustic sensor, that the   │
│ media playing device has played a question within a     │
│ media stream                                            │
│ 605                                                     │
└─────────────────────────────────────────────────────────┘
                            │
                            ▼
┌─────────────────────────────────────────────────────────┐
│ In response to the determination, record, by the        │
│ processor and via the acoustic sensor, an ambient       │
│ acoustic signal for a pre-determined time interval      │
│ 610                                                     │
└─────────────────────────────────────────────────────────┘
                            │
                            ▼
┌─────────────────────────────────────────────────────────┐
│ Detect, by the processor, a presence of a voice of a    │
│ user in the ambient acoustic signal                     │
│ 615                                                     │
└─────────────────────────────────────────────────────────┘
                            │
                            ▼
┌─────────────────────────────────────────────────────────┐
│ In response to the detection, provide, by the processor,│
│ the ambient acoustic signal to a remote computing system│
│ 620                                                     │
└─────────────────────────────────────────────────────────┘
```

Perform, by a remote computing system, speech recognition of an ambient acoustic signal to obtain a text response
705

Analyze, by the remote computing system, the text response to determine that a user has confirmed donation payment and indicated an amount of payment
710

Cause, by the remote computing system, a payment system associated with the user to perform a transfer of the amount of payment to a provider of the media stream
715

*FIG. 7*

AUDIENCE RESPONSE COLLECTION AND ANALYSIS

TECHNICAL FIELD

This disclosure generally relates to the field of broadcast communications. More particularly, this disclosure relates to methods and systems for collecting and analyzing audience response.

BACKGROUND

Media streams can be broadcast on many user devices, such as smart television sets, computers, tablets, vehicle audio systems, and so forth. Media streams may include interactive content expecting a response from audience. The interactive content may feature opinion polls, quizzes, donation requests, and so forth. Currently collection of audience responses to the interactive content is carried out by simply asking audience to send messages via mobile devices or via phone calls.

SUMMARY

This section introduces a selection of concepts in a simplified form that are further described in the Detailed Description section, below. This summary does not identify key or essential features of the claimed subject matter and is not intended to be an aid in determining the scope of the claimed subject matter.

This present disclosure is directed to systems and methods for collecting and analyzing audience response to interactive content in media streams. Some embodiments of the present disclosure may enable users to respond to interactive content while media streams are played by user devices.

According to an example embodiment, a system for collecting and analyzing an audience response is provided. The system may include a media playing device, an acoustic sensor, a processor communicatively coupled to the media playing device and to the acoustic sensor, and remote computing system communicatively coupled to the processor. The acoustic sensor and the processor can be integrated into the media playing device. The media playing device may include one of the following: a smartphone, a smart television set, a tablet computer, a desktop computer, an in-vehicle infotainment system, a smart home device, and so forth.

The processor may be configured to determine that the media playing device has played a question within a media stream. In an example embodiment, the media stream may include metadata indicative of starting the question. The determination that the media playing device has played the question may be based on the metadata. In further example embodiments, the determination that the media playing device has played the question may be based on an analysis of audio data of the media stream.

Based on the determination that the media playing device has played a question within a media stream, the processor may record, via the acoustic sensor, an ambient acoustic signal for a pre-determined time interval. The processor may be configured to detect presence of user voice in the ambient acoustic signal. In response to the detection of the presence of the voice, the ambient acoustic signal may be provided by the processor to the remote computing system.

In some example embodiments, prior to recording the ambient acoustic signal, the processor may analyze the ambient acoustic signal to determine presence of a keyword spoken by the user. Based on the presence of the keyword, the processor may cause the media playing device to reduce volume of the playback sound.

The remote computing system may be configured to perform speech recognition of the ambient acoustic signal in order to obtain a text response. The remote computing system may add the text response to a set of text responses. In an example embodiment, prior to adding the text response to the set of text responses, the remote computing system may validate the text response based on a criterion. The validation of the text response may include determining that the text response matches at least one of pre-determined responses to the question.

The remote computing system may be configured to analyze the set of text responses to obtain a statistics concerning text results. The remote computing system may be configured to provide the statistics to a provider of the media stream. In an example embodiment, the media stream may be broadcast live and the remote computing system may be configured to provide the statistics prior to ending the broadcast of the media stream. In further example embodiment, the media stream may include a pre-recorded media stream.

According to another example embodiment, a method for collecting and analyzing audience response is provided. The method may commence with determining, by a processor communicatively coupled to a media playing device and an acoustic sensor, that the media playing device has played a question within a media stream. The method may further include recording, by the processor and via the acoustic sensor, an ambient acoustic signal for a pre-determined time interval based on the determination that the media playing device has played the question. The method may further include detecting, by the processor, presence of voice of a user in the ambient acoustic signal. The method may continue with providing, by the processor, the ambient acoustic signal to a remote computing system and performing, by the remote computing system, speech recognition of the ambient acoustic signal to obtain a text response. The method may further include adding, by the remote computing system, the text response to a set of text responses and analyzing the set of text responses to obtain a statistics of text results. The method may continue with providing, by the remote computing system, the statistics to a provider of the media stream.

According to yet another example embodiment, a system for collecting donations is provided. The system may include a media playing device, an acoustic sensor, a processor communicatively coupled to the media playing device and to the acoustic sensor, and a remote computing system communicatively coupled to the processor. The processor may be configured to determine that the media playing device has played a donation request within a media stream and based on the determination, record, via the acoustic sensor, an ambient acoustic signal for a pre-determined time interval. The processor may be further configured to detect a presence of a voice of a user in the ambient acoustic signal and in response to the detection, provide the ambient acoustic signal to the remote computing system. The remote computing system may be configured to perform speech recognition of the ambient acoustic signal to obtain a text response and analyze the text response to determine that the user has confirmed donation payment and indicated an amount of payment. Based on the determination that the user has confirmed donation payment, the remote computing system may cause a payment system associated with the user to perform a transfer of the amount of payment to a provider of the media stream.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

FIG. 6 is a flow chart showing a method for collecting and analyzing an audience response, according to an example embodiment.

FIG. 7 is a flow chart showing a method for collecting donations, according to an example embodiment.

DETAILED DESCRIPTION

Figure 1:
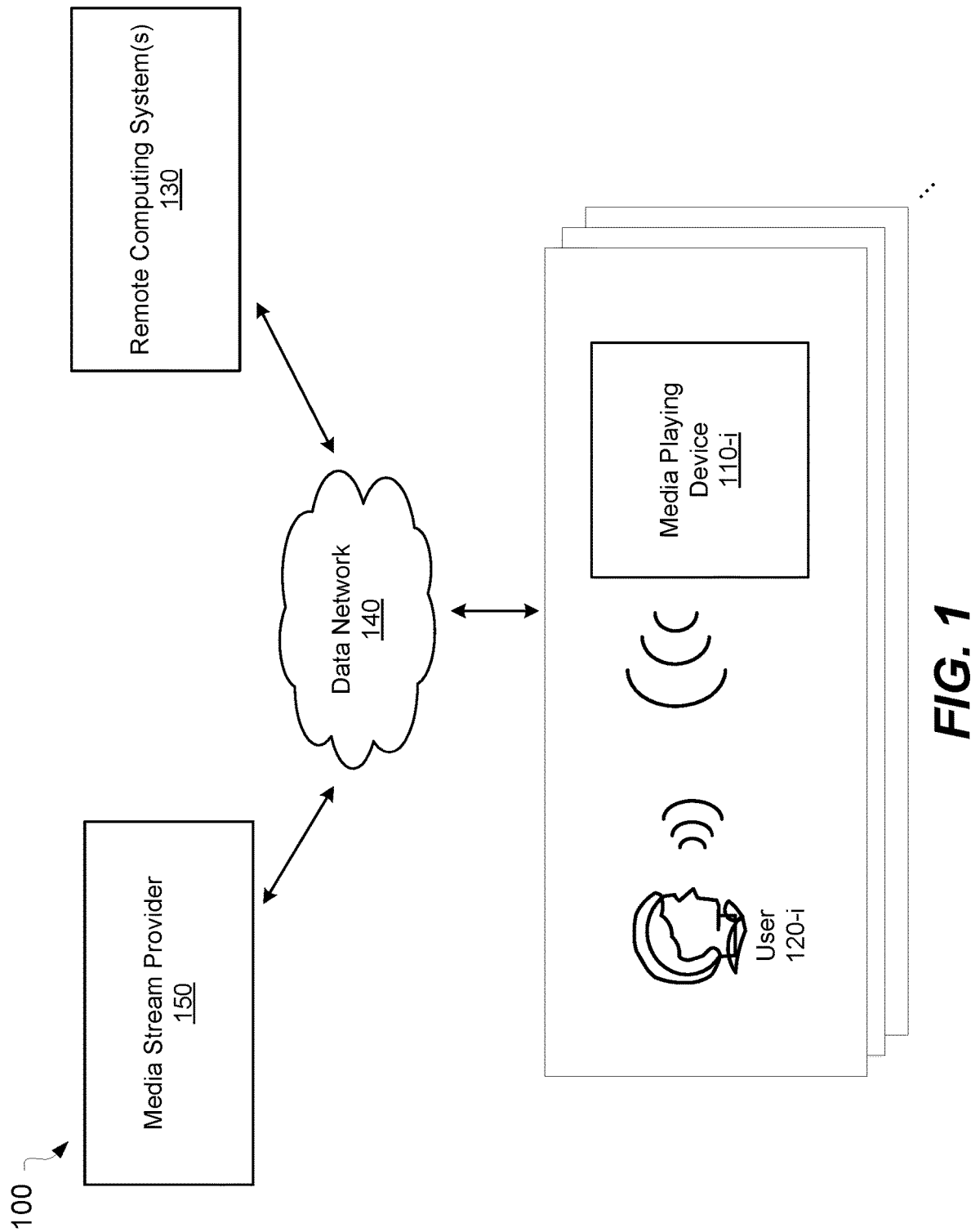
FIG. 1 is a block diagram showing an example environment, in which a system and a method for collecting and analyzing an audience response can be implemented.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

The technology described herein is concerned with systems and methods for collecting and analyzing an audience response. Some embodiments of the present technology may facilitate user interactions with an interactive content in media streams played on a user device. According to an example embodiment of the present disclosure, a system for collecting and analyzing an audience response is provided. The system may be associated with media playing devices of a plurality of users. The media playing devices may provide a media stream to users.

The media stream may include a live radio, a live television, an Internet radio, an Internet television, a live stream within social media, a podcast, a live audio, a video chat, and so forth. While the media stream is played, a question can be uttered. For example, a radio show presenter (also referred to as a radio host) may ask users to answer a question related to a topic of a radio show currently provided to the users through the media stream. In response to the question, a user may say a predetermined key word (e.g., "hey radio") to activate a microphone of the media playing device. Upon activation of the microphone, the user may respond to the question and the media playing device may record an ambient acoustic signal (i.e., an ambient sound) associated with the user. In some embodiments, the media playing device may be configured to automatically recognize, through an application running on the media playing device, that the question was included in the media stream. In these embodiments, the media playing device can be configured to, in response to recognizing the question, activate the microphone automatically to receive a response to the question.

The media playing device may provide the recorded ambient acoustic signal to a remote computing system associated with the system for collecting and analyzing the audience response. The remote computing system may recognize the ambient acoustic signal and obtain the user response in the form of a text response. The remote computing system may analyze text responses of the plurality of users and based on the analysis, generate analytics and statistics data associated with responses of the plurality users. The analytics and statistics data may be sent to a provider of the media stream, for example, to the radio show presenter, prior to ending the broadcast of the media stream. Therefore, the radio show presenter may be provided with an audience response (i.e., responses received from the plurality of users) to the question prior to ending the broadcast of the media stream. The radio show presenter may communicate the results in the form of the analytics and/or statistics data to the plurality of users during the radio show.

The system for collecting and analyzing an audience response may include a media playing device, an acoustic sensor, a processor communicatively coupled to the media playing device and to the acoustic sensor, and a remote computing system communicatively coupled to the processor. The processor may be configured to determine that the media playing device has played a question within a media stream. Based on the determination that the media playing device has played the question, the processor may record, via the acoustic sensor, an ambient acoustic signal for a pre-determined time interval, for example, 5, 10, or 15 seconds. After the pre-determined time interval, the acoustic sensor may be turned off. In some embodiments, the processor may be configured to cause the speaker of the media playing device to play a pre-recorded message, e.g., "Thank you," "Your response has been recorded," "OK," and so forth. The pre-recorded message may be stored, for example, in a storage associated with the remote computing system. The processor may be configured to detect presence of voice of a user in the ambient acoustic signal. In response to the detection of the presence of the voice, the processor may provide the recorded ambient acoustic signal to the remote computing system.

The remote computing system may perform speech recognition of the recorded ambient acoustic signal to obtain a text response. The remote computing system may add the text response to a set of text responses and analyze the set of text responses to obtain statistics of text results. The remote computing system may provide the statistics to a provider of the media stream.

Referring now to the drawings, FIG. 1 shows an example environment 100, in which a system and a method for collecting and analyzing an audience response can be implemented. The environment 100 may include one or more media playing devices 110-*i*, users 120-*i*, (i=1, . . . , N) associated with the media playing devices 110-*i*, remote computing system(s) 130, a media stream provider 150, and a data network 140.

Each of the media playing device 110-*i* (i=1, . . . , N) can include radio frequency receivers, transmitters, transceivers, wired and/or wireless telecommunications and/or networking devices, amplifiers, audio and/or video players, encoders, decoders, speakers, inputs, outputs, storage devices, user input devices, and the like. The media playing device 110-*i* can be configured to receive a media stream and play the media stream to the user 120-*i* using an output device, for example, speakers and earphones. The media playing device 110-*i* can be configured to sense an ambient acoustic sound using, for example, one or more microphones. The media playing device 110-*i* can be configured to detect the voice of the user 120-*i*. The media playing device 110-*i* may include, but is not limited to, a laptop computer, a desktop computer, a tablet computer, a phablet, a smart phone, a personal digital assistant, a media player, a mobile telephone, a smart television set, in-vehicle infotainment system, a smart home device, and the like. An example media playing device 110-*i* is described in detail in FIG. 2.

The media stream may include a live broadcast, including a live radio, a live television, an Internet radio, an Internet television, a live stream in one of the social media, a podcast, and so forth. The media stream can be streamed in analog format or digital format. The media stream may also include a podcast stored locally in a memory of the media playing device 110-*i* or remotely in a storage associated with the media stream provider 150.

The media stream may include one or more interactive contents. The interactive content may include an audio data and/or video data. In an example embodiment, the interactive content may include a request for a donation. In a further example embodiment, the interactive content may include a request to respond to one or more questions. In some embodiments, the media stream may include metadata that contain the data associated with the interactive content.

In some embodiments, the media playing device 110-*i* may include a radio receiver to receive the media stream using a radio network or a television network. In certain embodiments, the media stream can be delivered using the data network 140. The data network 140 can refer to any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network), Wi-Fi™ network, packet switching communications network, circuit switching communications network), Bluetooth™ radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks. In some embodiments, the data network 140 includes a corporate network, data center network, service provider network, mobile operator network, or any combinations thereof.

In some embodiments, the remote computing system(s) 130 may be implemented as a server(s) or a cloud-based computing resource(s) shared by multiple users. The remote computing system(s) 130 can include hardware and software available at a remote location and accessible over the data network 140. The remote computing system(s) 130 can be dynamically re-allocated based on demand. The cloud-based computing resources may include one or more server farms/clusters including a collection of computer servers which can be co-located with network switches and/or routers.

In some embodiments, the media playing device(s) 110-*i* can detect voice responses of users 120-*i* to an interactive content within a media stream. The media playing device(s) 110-*i* can record the voice responses and send the responses in form of audio data to the remote computing system(s) 130. The remote computing system(s) 130 can be configured to receive responses of users 120-*i* over the data network 140 and perform speech recognition of the responses in form of audio data to obtain the responses of the users in the form of text. The remote computing system(s) 130 can be configured to analyze the responses to determine statistics associated with the responses and provide the statistics to media stream provider 150. In certain embodiments, one or more media playing device(s) 110-*i* may perform speech recognition of the response of the user locally on the media playing device(s) 110-*i*. In these embodiments, the media playing device(s) 110-*i* can be configured to send to the remote computing system(s) 130, the response of the user 120-*i* in form of text instead of sending the response of the user 120-*i* in form of audio data.

Figure 2:
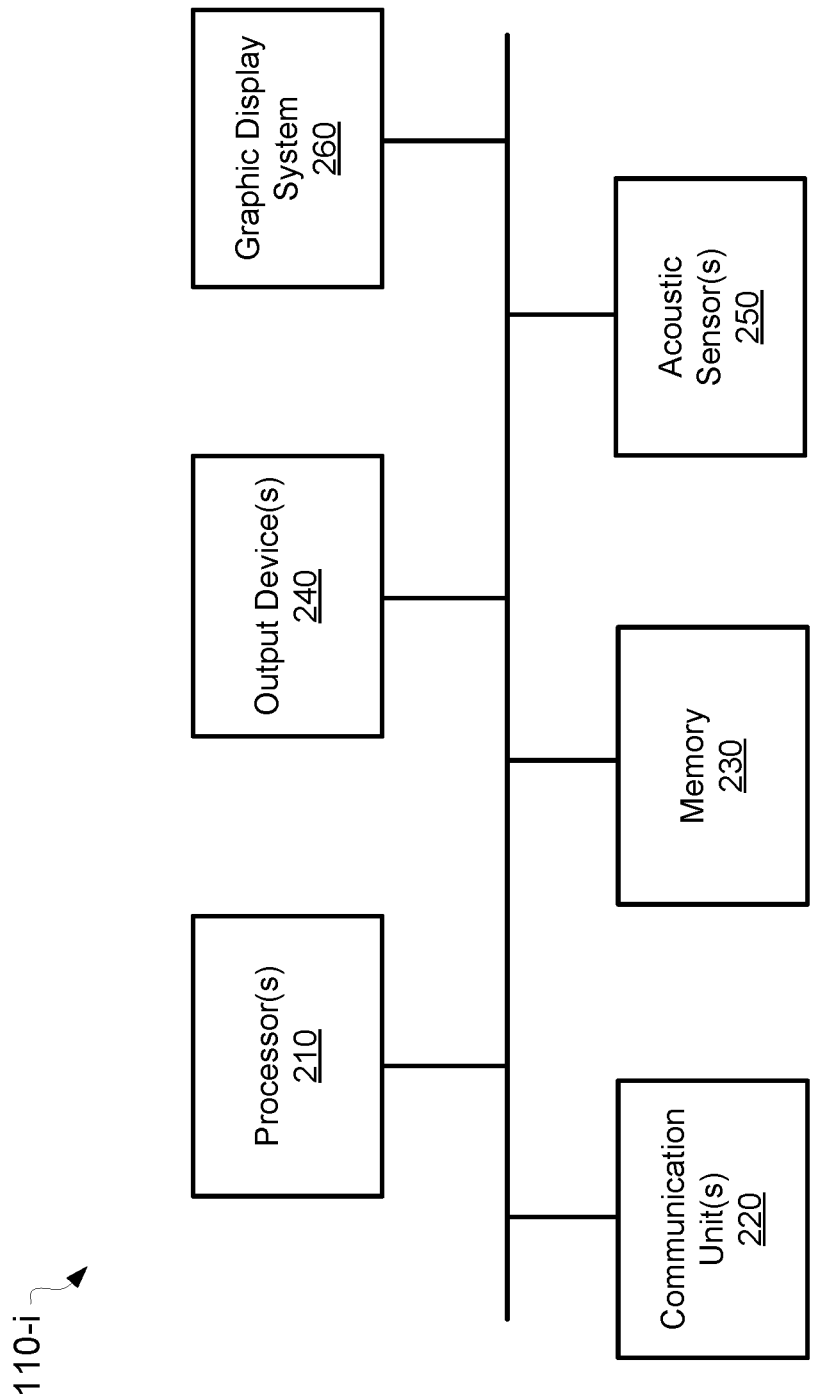
FIG. 2 is a block diagram showing a media playing device for collecting and analyzing an audience response, according to an example embodiment.

FIG. 2 is a block diagram showing a media playing device 110-*i* for collecting and analyzing an audience response, according to an example embodiment. FIG. 2 provides details of the media playing device 110-*i* of FIG. 1. In the illustrated embodiment, the media playing device 110-*i* may include one or more processor(s) 210, one or more communication unit(s) 220, a memory 230, one or more output device(s) 240, one or more acoustic sensor(s) 250, and a graphic display system 260. In other embodiments, the media playing device 110-*i* includes additional or other components necessary for operations of media playing device 110-*i*. Similarly, in certain embodiments, the media playing device 110-*i* includes fewer components that perform functions similar or equivalent to those depicted in FIG. 2.

In various embodiments, the processors 210 include hardware and/or software, which is operable to execute instructions stored in the memory 230. The processors 210 may perform floating point operations, complex operations, and other operations, including analyzing ambient acoustic signals to detect words spoken by users. The processors 210 may include general purpose processors, video processors, audio processing systems, and so forth.

In various embodiments, the communication unit(s) 220 can be configured to communicate with a network such as the Internet, WAN, LAN, cellular network, and so forth, to receive audio and/or video data of media streams. The received audio and/or video data may then be forwarded to the processor(s) 210 and the output device(s) 240. The processors 210 may analyze the received audio and/or video data to detect a beginning of interactive content and determine data associated with the interactive content. The data associated with the interactive content may include a timestamp of the interactive content and an identifier of the interactive content.

The acoustic sensor(s) 250 can include one or more microphones. The processors 210 can be configured to receive acoustic signals from an acoustic source, for example the user 120-*i*, via acoustic sensor(s) 250, and process the acoustic signal to determine presence of keywords in a voice of the user 120-*i*. The acoustic sensor(s) 250 can be spaced a distance apart to allow the processor(s) 210 to perform a noise and/or echo reduction in received acoustic signals.

In some embodiments, the output device(s) 240 may include any device which provides an audio output to a listener (for example, the user 120-*i*). The output device(s) 240 may include one or more speaker(s), an earpiece of a headset, a handset, and the like.

In various embodiments, the graphic display system 260 can be configured to provide a graphic user interface. In some embodiments, a touch screen associated with the graphic display system 260 can be utilized to receive an input from a user.

Figure 3:
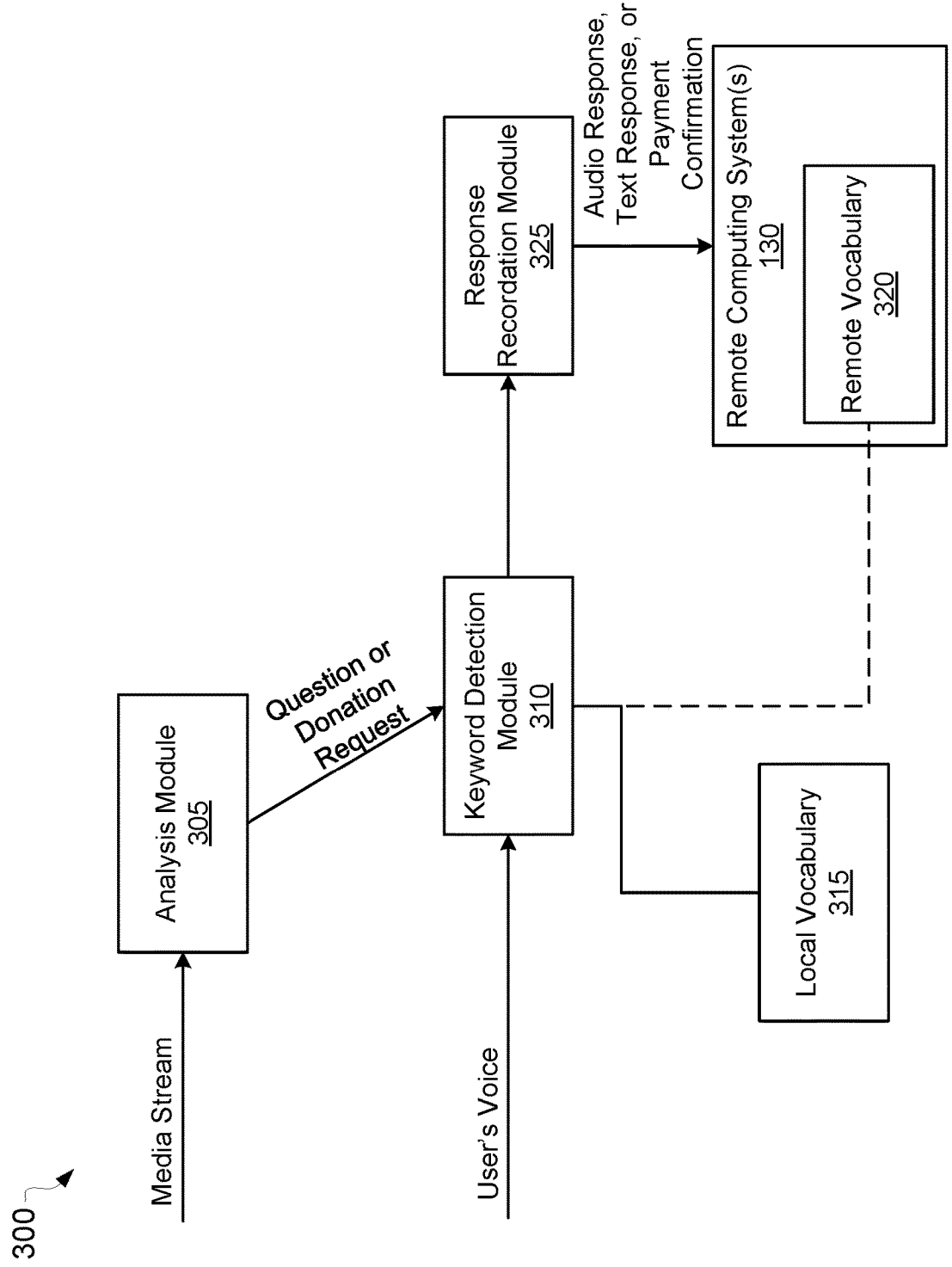
FIG. 3 is a block diagram illustrating an example system for collecting and analyzing an audience response, according to an example embodiment.

FIG. 3 is a block diagram illustrating an example system 300 for collecting and analyzing an audience response, according to an example embodiment. The system 300 may include an analysis module 305, a keyword detection module 310, and a response recordation module 325. In certain embodiments, the modules 305, 310, and 325 can be implemented as instructions stored in memory 230 of media playing device 110-*i* and executed by processor(s) 210 (shown in FIG. 2). In some embodiments, the system 300 may include a local vocabulary 315 stored in a memory 230 of the media playing device 110-*i* and a remote vocabulary 320 stored outside of the media playing device 110-*i*, for example, in remote computing system(s) 130.

The analysis module 305 can be configured to monitor a media stream played by the media playing device 110-*i*. The module 305 can be configured to detect that the media playing device 110-*i* has started playing an interactive content within the media stream. In an example embodiment, the interactive content may include a question. In a further example embodiment, the interactive content may include a donation request. In some embodiments, the analysis module 305 can determine the start of the interactive content based on the change of audio content in the media stream. In some embodiments, the time of the beginning of the interactive content can be provided in the metadata associated with the media stream. In some embodiments, the analysis module 305 may detect the beginning of the interactive content based on the metadata. The analysis module 305 may further provide an indication that the media playing device has played the interactive content to the keyword detection module 310.

The analysis module 305 may be configured to analyze a portion of the media stream that corresponds to the interactive content to determine data associated with the interactive content. The data associated with the interactive content can be provided in metadata of the media stream. The data associated with the interactive content may include information concerning a media stream provider, a name of a show, a name of a host of the show, a type of interactive content, an identifier of the interactive content, and so forth. The type of interactive content may include one of the following: a question with a yes or no response, a question having multiple possible responses, a question requiring a response in user's own words, a donation request, and so forth. The analysis module 305 can provide the data associated with media stream to the response recordation module 325.

Upon receiving an indication that the media playing device 110-*i* has played the interactive content, the keyword detection module 310 can analyze an ambient acoustic signal sensed by acoustic sensor(s) 250 of the media playing device 110-*i* shown in FIG. 2. In certain embodiments, the keyword detection module 310 may configure the output device(s) 240 of the media playing device 110-*i* to lower a level of volume of playing the media stream for a predetermined time.

The keyword detection module 310 may detect presence of voice of a user in the ambient acoustic signal. The keyword detection module 310 may also detect a presence of a pre-determined keyword in the voice of the user. In an example embodiment, the keyword detection module 310 may analyze the ambient acoustic signal using machine learning algorithms to detect pre-determined keywords or recognize patterns in the responses. The pre-determined keyword may include a key phrase such as "Hey, Radio," "Hey, TV," and so forth. The keyword detection module 310 can be configured to recognize similar key phrases pronounced in various languages other than English. Upon detection of the pre-determined keyword, the keyword detection module 310 can analyze a portion of the ambient acoustic signal after the pre-determined keyword to determine whether the user has spoken one or more words or phrases.

The keyword detection module 310 can be configured to compare a portion of the ambient acoustic signal to one or more phrases stored in local vocabulary 315. If keyword detection module 310 does not determine any phrases in local vocabulary that correspond to the portion of the ambient acoustic signal, the keyword detection module 310 may send the portion of the ambient acoustic signal to the remote computing system(s) 130. The remote computing system(s) 130 may recognize the portion of the ambient acoustic signal based on the remote vocabulary 320. The remote vocabulary 320 can be larger than the local vocabulary 315. In response to the recognition of the portion of the ambient acoustic signal, the keyword detection module 310 may generate text and provide the text to the response recordation module 325.

In some embodiments, the response recordation module 325 can be configured to send the recognized text to remote computing system(s) 130 for further analysis. In certain embodiments, the response recordation module 325 can send the portion of the acoustic portion of the ambient acoustic signal to the remote computing system(s) 130 instead of or in addition to the recognized text.

In an example embodiment, the interactive content may include a question. For example, a user may listen to a live radio and the interactive content in the form of the question may be provided to the user. The question may be provided by a radio show presenter or include a prerecorded audio file played during the radio show. The user may listen to the question and provide a response to the question. For example, the user may provide the response by voice. The response may be captured and provided to the remote computing system(s) 130 for analysis.

In a further example embodiment, the interactive content may include a donation request. For example, a user may listen to a live radio and the interactive content in the form of the donation request may be provided to the user. The donation request may be provided by a radio show presenter or include a prerecorded audio file played during the radio show. The user may listen to the donation request and decide to donate in response to the donation request. For example, the user may use a user voice to perform a command to make the donation and communicate an amount of the donation. The command of the user may be captured and recognized. In response to the determination that the user voice includes the command to make the donation, the donation can be made by activating a payment system associated with the media playing device and transferring a payment from a user account to an account of an entity to which the donation is to be made or an account of the party asking for the donation (e.g., the radio show, a charity, and a religious organization) that solicited the donation.

Figure 4:
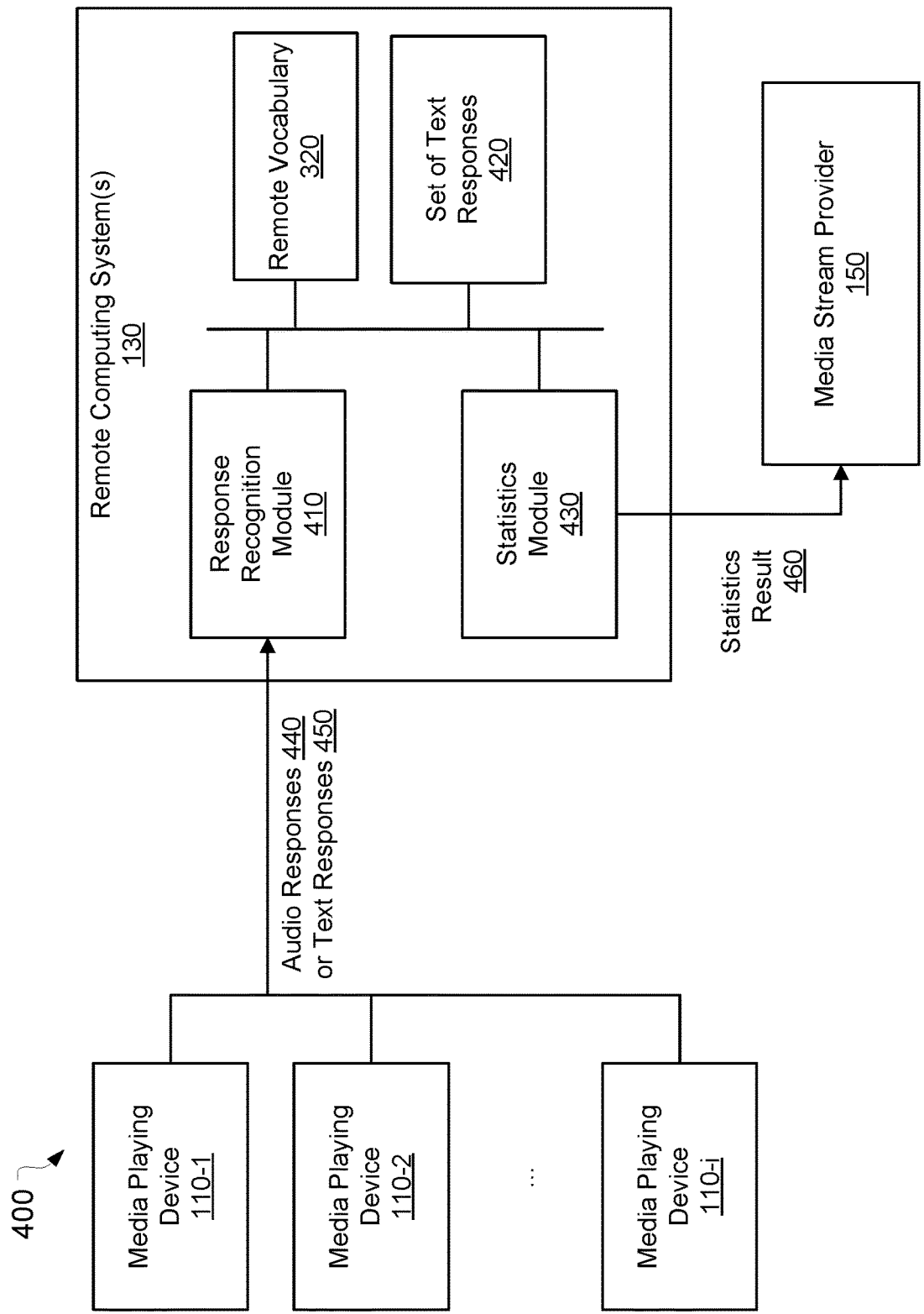
FIG. 4 is a block diagram illustrating an example system for collecting and analyzing an audience response, according to an example embodiment.

FIG. 4 is a block diagram 400 showing a system for collecting and analyzing an audience response, according to some example embodiments. A plurality of media playing devices 110-*i* may be in communication with the remote computing system 130. The remote computing system 130 may include a response recognition module 410, a statistics module 430, and a remote vocabulary 320.

A media stream provider 150 may provide a media stream to the media playing devices 110-*i*. The media stream may include a live radio, a live television, an Internet radio, an Internet television, a live stream in a social media, and so forth. In the course of playing the media stream on the media playing devices 110-*i*, a request to reply to a question can be provided to users of the media playing devices 110-*i*. For example, a radio show presenter may ask the users to answer a question related to a topic of a radio show currently provided to the users using the media stream. The question may be, for example, "What car do you drive?"

In response to the question, the users willing to respond may utter a predetermined key word (e.g., "hey, radio") to activate an acoustic sensor (e.g., a microphone) of the media playing devices 110-*i*. Upon activation of the acoustic sensor, each user may provide a user response to the question using a user voice. The user response may include, for example, "Ford™," "Toyota™," "Jeep™," "BMW™," and so forth. The media playing device may record, via the acoustic sensor, an ambient acoustic signal (i.e., an ambient sound) associated with the user. The media playing devices 110-*i* may provide the recorded ambient acoustic signal in the form of audio responses 440 to the remote computing system 130 associated with the system for collecting and analyzing the audience response. In some embodiments, the media playing devices 110-*i* can be configured to perform speech recognition of the ambient acoustic signal to obtain a text response. The media playing devices 110-*i* may provide the text response 450 to the remote computing system 130.

The response recognition module 410 of the remote computing system 130 can be configured to receive the audio responses 440 from the media playing devices 110-*i* and perform speech recognition of the audio responses 440 to obtain the text response. Specifically, the response recognition module 410 can be configured to compare at least a portion of the audio response 440 to one or more phrases stored in a remote vocabulary 320. In response to the recognition of the audio response 440, the response recognition module 410 may generate the text response. In an example embodiment, the audio responses 440 may further include an identifier. The identifier may be associated with the media stream, the question (i.e., interactive content), a specific radio show or TV show, and so forth. In other words, the identifier may associate the audio responses 440 with a specific question or a specific radio show or TV show.

In an example embodiment, the media stream associated with a radio show may have topics with specific start time and end time. One or more questions may be created for the topics. All responses that were received from users that are listeners of radio show during that timeframe between the start time and the end time of a specific topic may be attributed to the question associated with the specific topic.

The text response obtained by the response recognition module 410 upon speech recognition or the text response 450 received from the media playing devices 110-*i* (if the speech recognition is performed by the media playing devices 110-*i*) may be validated based on a predetermined criterion. The validation of the text response may include at least one of determining that the text response matches at least one of pre-determined responses to the question, determining that the text response includes a response relevant to the question, and so forth. If the text response is determined to be valid, the text response is added to a set of text responses 420. The set of text responses 420 may include a plurality of responses received from the users of the media playing devices 110-*i*.

The statistic module 430 is configured to analyze the set of text responses 420, generate analytics data associated with the set of text responses 420, and determine statistics results 460 associated with the set of text responses 420. The statistics results 460 may include the number of collected responses, a most popular response, distribution of responses, and so forth. The statistics results 460 may be provided to the media stream provider 150. Based on the identifier associated with the radio show and received along with the responses of the users, the analytics data and the statistics results 460 may be provided to the radio show presenter of the radio show that provided the question to the users. The analytics data and statistics results 460 may be provided to a computing device of the radio show presenter. The computing device of the radio show presenter may be in communication with the remote computing system 130. The radio show presenter may receive the analytics data and the statistics results 460 prior to ending the broadcast of the media stream. Therefore, the radio show presenter may be provided with an audience response (i.e., statistics results 460 associated with responses received from the plurality of users) to the question prior to ending the broadcast of the media stream. The radio show presenter may relay the statistics results 460 to the plurality of users during the radio show. The statistics results 460 may include, for example, "Ford™—30% of users," "Toyota™—25% of users," "BMW™—10% of users", "35% of users—other brands," or "Ford™—356 users," "Toyota™—245 users," "BMW™—143 users", "377 users—other brands."

In some embodiments, the media stream is not live and includes a pre-recorded audio or video file broadcast via a radio or TV. For example, the user may listen to a podcast. The podcast may have a question pre-recorded in the podcast. Upon listening to the question, the user may provide a response to the question. The response of the user may be analyzed by the remote computing system 130 as described above and statistics results can be provided to an entity associated with the podcast, e.g., an author of the podcast, owner of the podcast, and so forth. For example, the author of the podcast may ask the users whether they like the podcast and receive statistical results showing, for an example, that 45% of users like the podcast.

Figure 5:
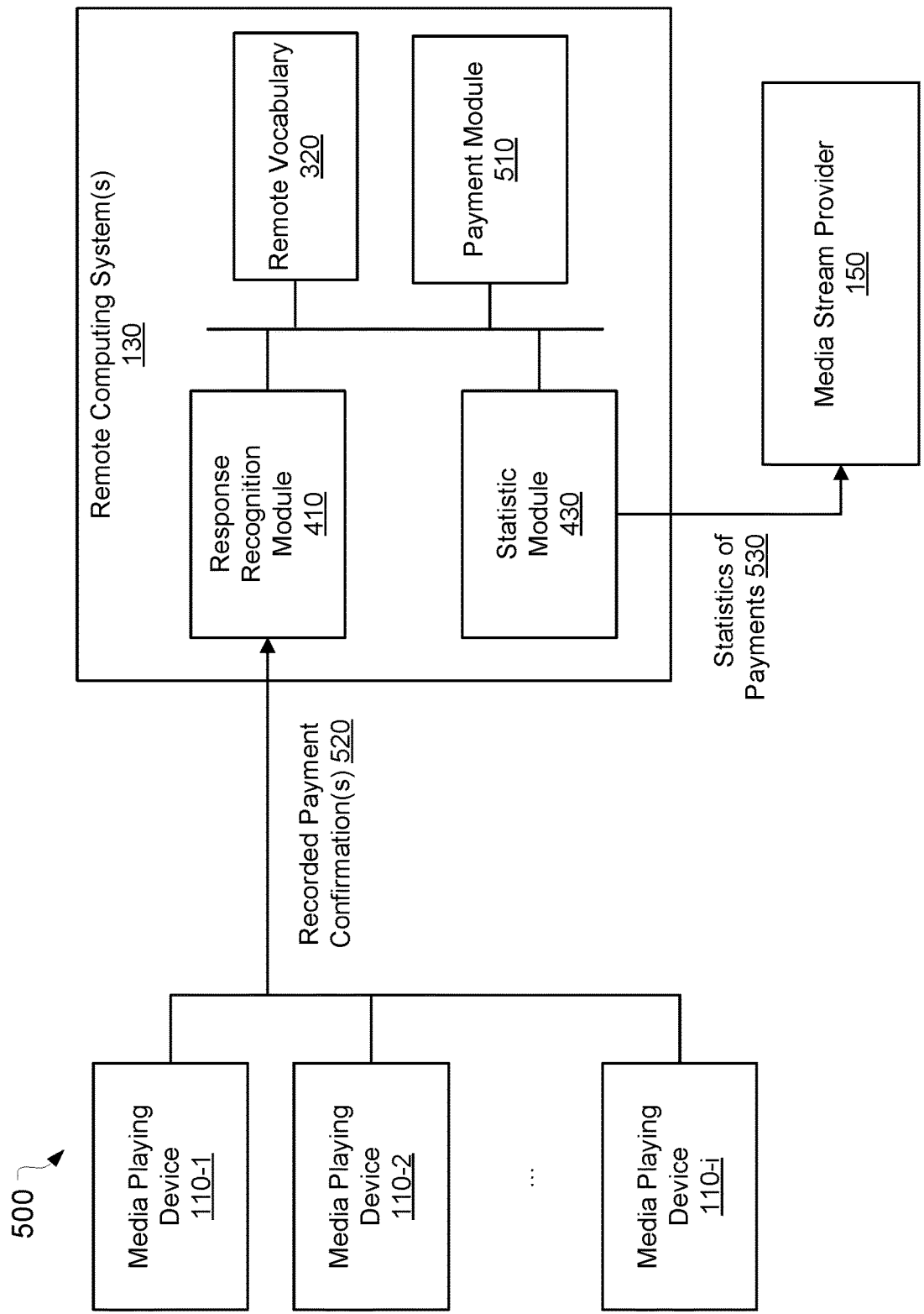
FIG. 5 is a block diagram illustrating an example system for collecting donations, according to an example embodiment.

FIG. 5 is a block diagram showing a system for collecting donations, according to some example embodiments. A plurality of media playing devices 110-*i* may be in communication with the remote computing system 130. The remote computing system 130 may include a response recognition module 410, a statistics module 430, a remote vocabulary 320, and a payment module 510.

A media stream provider 150 may provide a media stream to the media playing devices 110-*i*. The media stream may include a live radio, a live television, an Internet radio, an Internet television, a live stream in a social media, a podcast, and so forth. In the course of playing the media stream on the media playing devices 110-*i*, a donation request can be relayed to users of the media playing devices 110-*i*. For example, a radio show presenter may ask the users to donate to the radio show presenter, to a guest on the radio show, to a person or organization associated with the topic of the radio show, and so forth. The donation request may include a request to donate a predetermined amount of money (e.g., 10 dollars), a request to donate any amount of money the user wants to donate, a request to make a subscription to donate a predetermined amount according to a predetermined schedule (e.g., monthly), and so forth.

In response to the donation request, the users that want to donate may utter a predetermined key word (e.g., "hey radio") to activate an acoustic sensor (e.g., a microphone) of the media playing devices 110-*i*. Upon activation of the acoustic sensor, the user may provide a payment confirmation 520 via a user voice. For example, the user may say "yes," "I want to donate," and so forth. If the donation request does not include the requested predetermined amount of money, the user may also state which amount of money the user wants to donate. For example, the user may say "I want to donate 10 dollars."

The media playing device 110-*i* may record, via the acoustic sensor, an ambient acoustic signal (i.e., an ambient sound) associated with the user. The media playing devices 110-*i* may provide the recorded ambient acoustic signal in the form of the payment confirmation 520 to the remote computing system 130 associated with the system for collecting and analyzing the audience response. In some embodiments, the media playing devices 110-*i* may be configured to perform speech recognition of the ambient acoustic signal to obtain a text response. The media playing devices 110-*i* may provide the text response 450 to the remote computing system 130. The text response 450 may include, for example, "donate 10 dollars."

The response recognition module 410 of the remote computing system 130 may be configured to receive the payment confirmation 520 from the media playing devices 110-*i* and perform speech recognition of the payment confirmation 520 to obtain the recognized payment confirmation. Specifically, the response recognition module 410 can be configured to compare at least portion of the payment confirmation 520 to one or more phrases stored in a remote vocabulary 320.

In an example embodiment, the payment confirmation 520 may further include an identifier associated with at least one of the media stream, the donation request (i.e., interactive content), a specific radio show or TV show, and so forth. Based on recognition of the payment confirmation 520, the response recognition module 410 may provide the recognized payment confirmation to the payment module 510.

The payment module 510 can store data associated with a payment account of the user or may receive payment account information from media playing devices 110-*i* together with the payment confirmation 520. The payment module 520 may also receive from the media playing device 110-*i* or the response recognition module 410, the identifier of the show or the donation request. Based on the identifier or the donation request, the payment module 510 may determine information associated with a payment account of an entity to which the amount donated by the user needs to be paid. In an example embodiment, the payment module 510 may communicate with a payment system/application running on the media playing devices 110-*i*, such as Apply Pay™, Google Pay™ or any other payment system/application, to initiate and perform the payment from the user payment account to the payment account of the entity that requested the donation.

The statistics module 430 collects statistics 530 of payments. The statistics 530 of payments may include a total sum, the number of payments, a minimal payment, a maximal payment, and so forth. The statistics 530 of payments may be provided to the media stream provider 150.

Based on the identifier associated with the donation request, the statistics 530 of payments may be provided to the radio show presenter of the radio show that provided the donation question to the users. The radio show presenter may receive the statistics 530 of payments prior to ending the broadcast of the media stream. Therefore, the radio show presenter may be provided with an audience response (i.e., statistics 530 of payments from the plurality of users) to the donation question prior to ending the broadcast of the media stream. The radio show presenter may state the statistics 530 of payments to the plurality of users during the radio show.

FIG. 6 is a flow chart showing a method 600 for collecting and analyzing an audience response, according to an example embodiment. The method 600 can be implemented by using the media playing devices 110-*i* shown in FIG. 1 and FIG. 2. In some embodiments, the operations of method 600 may be combined, performed in parallel, or performed in a different order. The method 600 may also include additional or fewer operations than those illustrated.

The method 600 may commence in block 605 with determining, by a processor communicatively coupled to a media playing device and an acoustic sensor, that the media playing device has played a question within a media stream. In an example embodiment, the acoustic sensor and the processor may be integrated into the media playing device. The media stream may be broadcast live or may include a pre-recorded media stream. The media stream may include metadata indicative of starting the question. The determination that the media playing device has played the question may be based on the metadata indicative of starting the question. In some example embodiments, the determination that the media playing device has played the question may be based on an analysis of audio data of the media stream.

In block 610, the method 600 may include recording, by the processor and via the acoustic sensor, an ambient acoustic signal for a pre-determined time interval. The ambient acoustic signal may be recorded based on the determination that the media playing device has played the question.

In some example embodiments, prior to the recording the ambient acoustic signal, the method 600 may include analyzing the ambient acoustic signal to determine a presence of a keyword spoken by the user. Based on the determination of the presence of the keyword, the media playing device may be caused to reduce a volume of the media stream. Therefore, the recorded ambient acoustic signal may include the recorded user voice without the media stream because the volume the media stream was lowered while the user was providing the response.

In block 615, the method 600 may include detecting, by the processor, a presence of a voice of a user in the ambient acoustic signal. In response to the detection of the presence of the voice, the ambient acoustic signal may be provided to a remote computing system in block 620.

The method 600 may further include performing, by the remote computing system, speech recognition of the ambient acoustic signal to obtain a text response. The method 600 may continue with adding, by the remote computing system, the text response to a set of text responses and analyzing, by the remote computing system, the set of text responses to obtain a statistics of text results.

In some embodiments, prior to adding the text response to the set of text responses, the remote computing system may validate the text response based on a predetermined criterion. The validation of the text response may include determining that the text response matches at least one of pre-determined responses to the question.

The method 600 may further include providing, by the remote computing system, the statistics to a provider of the media stream. In an example embodiment, when the media stream is broadcast live, the remote computing system may be configured to provide the statistics to the provider of the media stream prior to ending the broadcast of the media stream.

FIG. 7 is a flow chart showing a method 700 for collecting donations, according to an example embodiment. In some embodiments, the method 700 can be a continuation of method 600 of FIG. 6. The method 700 can be implemented by using remote computing system(s) 130 shown in FIG. 1. In some embodiments, the operations of method 700 may be combined, performed in parallel, or performed in a different order. The method 700 may also include additional or fewer operations than those illustrated.

The processor may determine whether the media playing device has played a donation request within a media stream. Based on the determination, the processor may record, via the acoustic sensor, an ambient acoustic signal for a predetermined time interval. The processor may detect a presence of a voice of a user in the ambient acoustic signal and, in response to the detection of the voice, provide the ambient acoustic signal to the remote computing system.

The method 700 may include performing speech recognition of the ambient acoustic signal by the remote computing system in block 705 to obtain a text response. The method 700 may continue in block 710 with analyzing the text response by the remote computing system to determine that the user has confirmed donation payment and indicated an amount of payment. In block 715, the method 700 may continue with causing a payment system associated with the user to perform a transfer of the amount of payment to a provider of the media stream.

Figure 8:
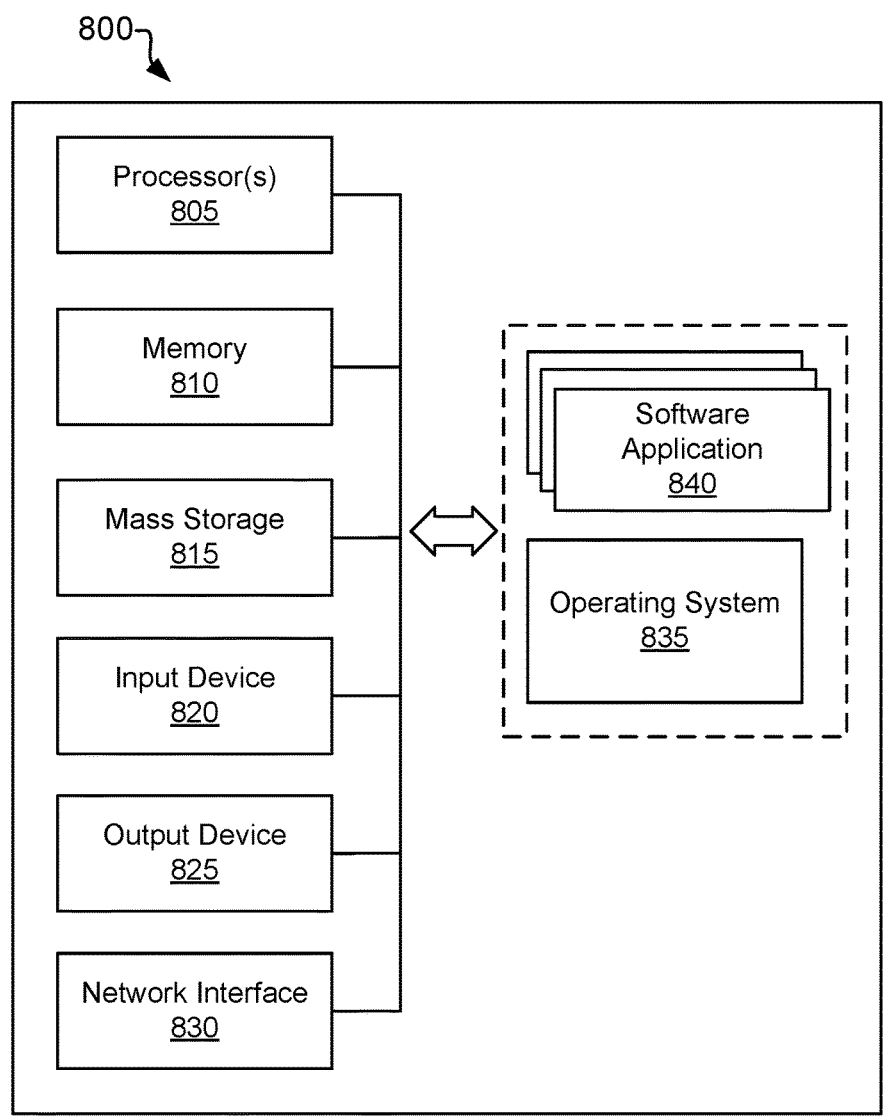
FIG. 8 is a high-level block diagram illustrating an example computer system, within which a set of instructions for causing the machine to perform any one or more of the methodologies discussed herein can be executed.

FIG. 8 is a high-level block diagram illustrating an example computer system 800, within which a set of instructions for causing the machine to perform any one or more of the methodologies discussed herein can be executed. The computer system 800 may include, refer to, or be an integral part of, one or more of a variety of types of devices, such as a general-purpose computer, desktop computer, laptop computer, tablet computer, netbook, mobile phone, smartphone, personal digital computer, smart television device, and server, among others. In some embodiments, the computer system 800 is an example of media playing device(s) 110-i or remote computer resource(s) 130. Notably, FIG. 8 illustrates just one example of the computer system 800 and, in some embodiments, the computer system 800 may have fewer elements/modules than shown on FIG. 8 or more elements/modules than shown on FIG. 8.

The computer system 800 includes one or more processors 805, a memory 810, one or more storage devices 815, one or more input devices 820, one or more output devices 825, and network interface 830. One or more processors 805 are, in some examples, configured to implement functionality and/or process instructions for execution within the computer system 800. For example, the processors 805 may process instructions stored in memory 810 and/or instructions stored on storage devices 815. Such instructions may include components of an operating system 835 or software applications 840. Computer system 800 may also include one or more additional components not shown in FIG. 8, such as a housing, power supply, battery, global positioning system (GPS) receiver, and so forth.

Memory 810, according to one example, is configured to store information within the computer system 800 during operation. Memory 810, in some example embodiments, may refer to a non-transitory computer-readable storage medium or a computer-readable storage device. In some examples, memory 810 is a temporary memory, meaning that a primary purpose of memory 810 may not be long-term storage. Memory 810 may also refer to a volatile memory, meaning that memory 810 does not maintain stored contents when memory 810 is not receiving power. Examples of volatile memories include random access memories (RAM), dynamic random access memories (DRAM), static random access memories (SRAM), and other forms of volatile memories known in the art. In some examples, memory 810 is used to store program instructions for execution by the processors 805. Memory 810, in one example, is used by software (e.g., the operating system 835 or applications 840). Generally, software applications 840 refer to software applications suitable for implementing at least some operations of the methods for providing a location-based gaming experience as described herein.

One or more storage devices 815 can also include one or more transitory or non-transitory computer-readable storage media and/or computer-readable storage devices. In some embodiments, storage devices 815 may be configured to store greater amounts of information than memory 810. Storage devices 815 may further be configured for long-term storage of information. In some examples, the storage devices 815 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Still referencing to FIG. 8, the computer system 800 may also include one or more input devices 820. The input devices 820 may be configured to receive input from a user through tactile, audio, video, or biometric channels. Examples of input devices 820 may include a keyboard, keypad, mouse, trackball, touchscreen, touchpad, microphone, one or more video cameras, image sensors, fingerprint sensors, or any other device capable of detecting an input from a user or other source, and relaying the input to computer system 800, or components thereof.

The output devices 825, in some examples, may be configured to provide output to a user through visual or auditory channels. Output devices 825 may include a video graphics adapter card, a liquid crystal display (LCD) monitor, a light emitting diode (LED) monitor, an organic LED monitor, a sound card, a speaker, a lighting device, a LED, a projector, or any other device capable of generating output that may be intelligible to a user. Output devices 825 may also include a touchscreen, presence-sensitive display, or other input/output capable displays known in the art.

The computer system 800, in some example embodiments, also includes network interface 830. The network interface 830 can be utilized to communicate with external devices via one or more data networks such as one or more wired, wireless, or optical networks including, for example, the Internet, intranet, LAN, WAN, cellular phone networks, Bluetooth radio, and an IEEE 902.11-based radio frequency network, among others. The network interface 830 may be a network interface card, such as an Ethernet card, an optical transceiver, a radio frequency transceiver, or any other type of device that can send and receive information.

The operating system 835 may control one or more functionalities of computer system 800 and/or components thereof. For example, the operating system 835 may interact with the applications 840 and may facilitate one or more interactions between the applications 840 and components of the computer system 800. As shown in FIG. 8, the operating system 835 may interact with or be otherwise coupled to the application(s) 840 and components thereof. In some embodiments, application(s) 840 may be included in operating system 835. In these and other examples, virtual modules, firmware, or software may be part of the applications 840.

Thus, methods of and systems for collecting and analyzing an audience response have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for collecting and analyzing an audience response, the system comprising:
    a media playing device;
    an acoustic sensor;
    a processor communicatively coupled to the media playing device and to the acoustic sensor; and
    a remote computing system communicatively coupled to the processor, wherein the processor is configured to:
        determine that the media playing device has played a question within a media stream;
        based on the determination, record, via the acoustic sensor, an ambient acoustic signal for a pre-determined time interval;
        detect a presence of a voice of a user in the ambient acoustic signal; and
        in response to the detection, provide the ambient acoustic signal to the remote computing system; and
    wherein the remote computing system is configured to:
        perform speech recognition of the ambient acoustic signal to obtain a text response;
        add the text response to a set of text responses;
        analyze the set of text responses to obtain a statistics of text results; and
        provide the statistics to a provider of the media stream.

2. The system of claim 1, wherein:
    the media stream includes metadata indicative of starting the question; and
    the determination that the media playing device has played the question is based on the metadata.

3. The system of claim 1, wherein the determination that the media playing device has played the question is based on an analysis of audio data of the media stream.

4. The system of claim 1, wherein the media stream is broadcast live and the remote computing system is configured to provide the statistics prior to ending the broadcasting of the media stream.

5. The system of claim 1, wherein the media stream includes a pre-recorded media stream.

6. The system of claim 1, wherein the remote computing system is configured to, prior to adding the text response to the set of text responses, validate the text response based on a criterion.

7. The system of claim 6, wherein the validation of the text response includes determining that the text response matches at least one of pre-determined responses to the question.

8. The system of claim 1, wherein the processor is further configured to:
    prior to the recording of the ambient acoustic signal, analyze the ambient acoustic signal to determine a presence of a keyword spoken by the user; and
    cause the media playing device to reduce a volume of playing the media stream.

9. The system of claim 1, wherein the acoustic sensor and the processor are integrated into the media playing device.

10. The system of claim 1, wherein the media playing device includes one of the following: a smartphone, a smart television set, a tablet computer, a desktop computer, an in-vehicle infotainment system, and a smart home device.

11. A method for collecting and analyzing an audience response, the method comprising:
    determining, by a processor communicatively coupled to a media playing device and an acoustic sensor, that the media playing device has played a question within a media stream;
    based on the determination, recording, by the processor and via the acoustic sensor, an ambient acoustic signal for a pre-determined time interval;
    detecting, by the processor, a presence of a voice of a user in the ambient acoustic signal;
    in response to the detection, providing, by the processor, the ambient acoustic signal to a remote computing system;
    performing, by the remote computing system, speech recognition of the ambient acoustic signal to obtain a text response;
    adding, by the remote computing system, the text response to a set of text responses;
    analyzing, by the remote computing system, the set of text responses to obtain a statistics of text results; and
    providing, by the remote computing system, the statistics to a provider of the media stream.

12. The method of claim 11, wherein:
    the media stream includes metadata indicative of starting the question; and
    the determination that the media playing device has played the question is based on the metadata.

13. The method of claim 11, wherein the determination that the media playing device has played the question is based on an analysis of audio data of the media stream.

14. The method of claim 11, wherein the media stream is broadcast live and the remote computing system is configured to provide the statistics to the provider of the media stream prior to ending the broadcasting of the media stream.

15. The method of claim 11, wherein the media stream includes a pre-recorded media stream.

16. The method of claim 11, further comprising, prior to adding the text response to the set of text responses, validating, by the remote computing system, the text response based on a criterion.

17. The method of claim 16, wherein the validating the text response includes determining that the text response matches at least one of pre-determined responses to the question.

18. The method of claim 11, further comprising:
    prior to the recording the ambient acoustic signal, analyzing, by the processor, the ambient acoustic signal to determine a presence of a keyword spoken by the user; and causing, by the processor, the media playing device to reduce a volume of playing the media stream.

19. The method of claim 11, wherein the acoustic sensor and the processor are integrated into the media playing device.

20. A system for collecting donations, the system comprising:
- a media playing device;
- an acoustic sensor;
- a processor communicatively coupled to the media playing device and to the acoustic sensor; and
- a remote computing system communicatively coupled to the processor, wherein the processor is configured to:
  - determine that the media playing device has played a donation request within a media stream;
  - based on the determination, record, via the acoustic sensor, an ambient acoustic signal for a pre-determined time interval;
  - detect a presence of a voice of a user in the ambient acoustic signal; and
  - in response to the detection, provide the ambient acoustic signal to the remote computing system; and
- wherein the remote computing system is configured to:
  - perform speech recognition of the ambient acoustic signal to obtain a text response;
  - analyze the text response to determine that the user has confirmed donation payment and indicated an amount of payment; and
  - cause a payment system associated with the user to perform a transfer of the amount of payment to a provider of the media stream.

* * * * *